E. E. SLICK.
MINE CAR WHEEL.
APPLICATION FILED JUNE 9, 1915.

1,203,800.

Patented Nov. 7, 1916.

WITNESSES:
Elmer Seavey.
F. A. Stahl.

INVENTOR
Edwin E. Slick.
BY Geo. E. Thackray
his ATTORNEY

UNITED STATES PATENT OFFICE.

EDWIN E. SLICK, OF WESTMONT BOROUGH, PENNSYLVANIA.

MINE-CAR WHEEL.

1,203,800.  Specification of Letters Patent. Patented Nov. 7, 1916.

Application filed June 9, 1915. Serial No. 32,996.

*To all whom it may concern:*

Be it known that I, EDWIN E. SLICK, a citizen of the United States, residing in the Westmont borough, in the county of Cambria and State of Pennsylvania, (whose post-office address is Johnstown, Pennsylvania,) have invented certain new and useful Improvements in Mine-Car Wheels; and I do hereby declare the following to be a full, clear, and exact description of the invention, such as will enable others skilled in the art to which it appertains to make and use the same.

My invention relates to improvements in car wheels with special relation to the form of the same, and the construction whereby the wheel and a rotary axle are simply and firmly secured together.

My improved wheel is particularly adapted for use on small mine cars, industrial cars for light railways, hand-cars, push-cars and similar vehicles, although at the same time it is also adapted for use on heavier or standard cars or vehicles where such constructions are applicable.

Figure 1:
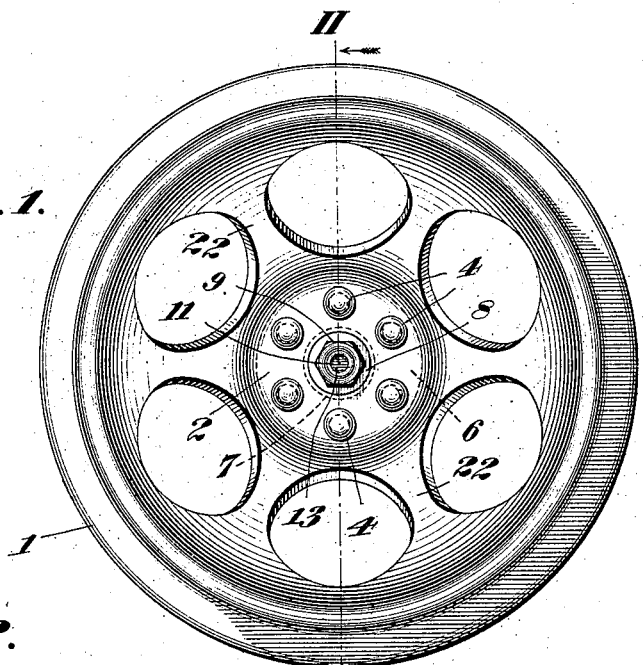
Figure 2:
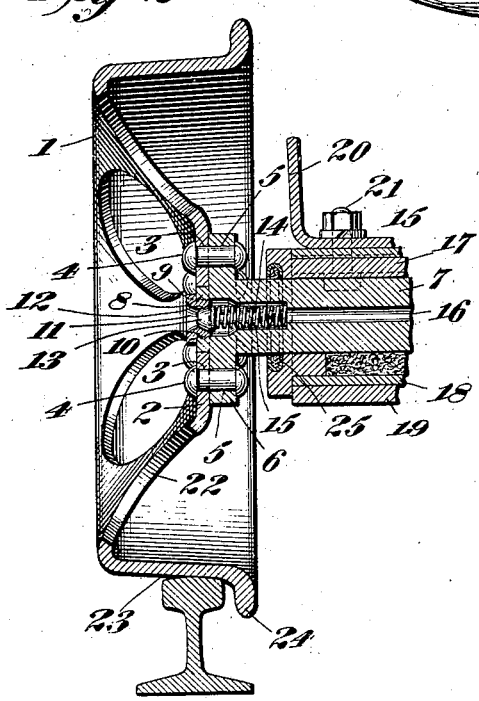
Figure 3:
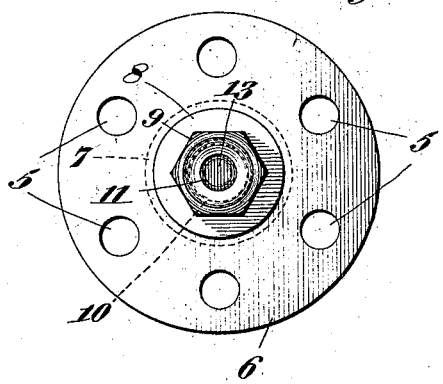

Referring now to the annexed sheet of drawings which form part of this specification: Figure 1 is a side elevation of my car wheel viewed from the outside thereof, showing it attached to the end of the car axle; Fig. 2 is a transverse sectional elevation taken on the line II—II of Fig. 1; while Fig. 3 is an end elevation, on an enlarged scale, of the car axle.

Referring now to the characters of reference on the drawings: 1 indicates my car wheel in general, 2 the central depressed portion of the web thereof, 3 are rivet or bolt holes in the said portion of the web, 4 are rivets whereby the wheel is secured to the end collar or the flange 6 of the axle through the rivet holes 5 therein.

7 represents the body portion of the axle which is cylindrical, 8 is an annular projection formed on the outer end of the axle, around and against which the edge of the web portion 2 is fitted as shown, whereby the wheel is accurately centered and maintained on the axle.

9 is the outer portion of the oil valve seat-block which is shown as hexagonal so as to be easily screwed into or out of position with a wrench, while 10 is the screw-threaded portion of the valve seat-block which is provided with the hole 11 therethrough; the valve seat 12 is formed therein, against which is normally seated the valve 13 which is provided with a stem 14 and a spring 15 for holding it in closed position against the seat.

16 is an oil opening in the axle adapted to convey oil or other lubricant to the outer bearings and to the inner bearings, which inner bearings are not shown.

17 is an outer journal bearing which may be composed of cast iron or anti-friction metal as desired, and 18 is the outer casing of the axle which is preferably made of a pipe or tube within which the axle 7 is mounted, as illustrated.

19 is a strap adapted to secure the axle casing to the car body, 20 is a portion of the car body on which the axle casing is mounted and secured by means of the bolts 21 and the strap 19. The spokes or uncut portion of the web are indicated as 22, the tread portion of the wheel is indicated as 23, which is illustrated as being coned or tapered as customary in such constructions, while the flange 24 of the wheel is thickened as compared with the tread, in order to provide for strength and wear.

In forming my wheel, I may upset the edges of the plate blank, thereby thickening the flange portions prior to giving them their final shape, as shown.

25 represents a felt or fiber washer, preferably contained in a casing, to prevent the escape of oil or lubricant around the axle, and it should be noted that my arrangement is such that there is a space between the end of the end bearing and the wheel so that during the rotation of the wheel, there is no rubbing of the surfaces at this point, the end thrust being taken up by a thrust bearing at the end of the axle, not shown, thereby avoiding friction and cutting between the rotary wheel hub and the adjacent stationary portions.

My improved wheel is preferably made of steel of any proper degree of hardness to withstand wear and may be drawn from an integral plate by means of suitable dies or forging apparatus, the plate being preferably heated before being shaped.

In order to lighten the wheel and permit it and the parts behind it to be readily inspected, the web is provided with a plurality of openings shown in the drawings as substantially circular, formed by punching portions out of the plate, but these openings may be of any other form or they may be omitted and the spoke portions may be of any conformation desired, as will be readily understood.

The axles illustrated may be either continuous from one side of the car to the other, or where the cars have to turn around tracks of small radii, they are preferably divided at the center and each axle has in this case, a plurality of bearings, one near the outer side of the car, one near the center of the car and a thrust bearing near the center of the car to prevent the axle from moving longitudinally, and in addition it is provided with means for holding the axle from moving longitudinally in or out while at the same time allowing it to rotate.

The outer end of my axle is formed either by upsetting, or otherwise, with a flange or collar 6, the rivet holes in same and in the wheel, being absolutely concentric with the center of the axle and with the thread of the wheel so that the wheel is accurately centered on the axle and held firmly in position by means of a considerable number of bolts or rivets 6, as shown in the illustration. If desired, I may also bore out the central opening in the web of my wheel and turn or fit the annular projection 8 on the end of the axle so that these two parts when assembled, fit closely together, which further insures that the wheel tread and the axle shall be truly concentric and firmly maintained together in this position.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. The combination with an axle having one or more external journal bearings, of a car wheel provided with a web portion which abuts against and is secured to a projecting flange integral with the end of the axle.

2. The combination with an axle having one or more external journal bearings, of a car wheel provided with a web portion, the side of which abuts, and is secured to, a projecting flange integral with the axle and means for securing the same together.

3. A car wheel provided with a web portion having holes therethrough, in combination with an axle having external journal bearings provided with an integral end collar abutting said web portion, holes through said collar registering with the holes aforesaid and means passing through said holes adapted to secure the wheel to the axle.

4. An integrally formed plate wheel provided with a web portion, in combination with an axle provided with an integral flange on the end thereof abutting said web portion and means passing through the flange and web portion adapted to secure the same together.

5. A pressed steel plate wheel provided with an in-pressed web portion, a central opening therein, in combination with an axle provided with an integral flange on the end thereof, an annular projection at the end of said axle, the outer walls of said annular projection and the walls of the central opening in the web being formed concentric with the axle and the wheel and adapted to fit together, and means for securing said web to the flange.

6. A pressed metal wheel provided with an in-pressed web portion, the inner surface of which is substantially flat, in combination with an axle provided with an integral outwardly projecting collar with flat end near the extremity thereof and mounted against the flat surface of the wheel web and means for securing the wheel and the said flange together.

7. A car axle provided with an outwardly projecting annular flange near the end thereof, a smaller annular projection at the end of and concentric with said axle, a wheel having a web portion mounted against said flange and provided with a central opening, the inner surface of which contacts with the outer surface of the annular projection and means passing through said web and flange adapted to secure the parts together.

8. A car axle provided with an outwardly projecting annular flange near the end thereof, a smaller projection at the end of and concentric with said axle, a wheel having a web portion mounted against said flange and provided with a central opening, the inner surface of which contacts with the outer surface of the projection and means passing through said web and flange adapted to secure the parts together.

In witness whereof I have hereunto set my hand in the presence of two witnesses.

EDWIN E. SLICK.

Witnesses:
 OLIVER B. HICKOX,
 F. A. STAHL.

It is hereby certified that in Letters Patent No. 1,203,800, granted November 7, 1916, upon the application of Edwin E. Slick, of Westmont Borough, Pennsylvania, for an improvement in "Mine-Car Wheels," an error appears in the printed specification requiring correction as follows: Page 2, line 60, claim 3, after the word "bearings" insert the word *and;* and that the said Letters Patent should be read with this correction therein that the same may conform to the record of the case in the Patent Office.

Signed and sealed this 28th day of November, A. D., 1916.

[SEAL.]

F. W. H. CLAY,

*Acting Commissioner of Patents.*

Cl. 101—172.